Nov. 27, 1962
A. WHITMORE
3,065,647
HAND OPERATING MEANS FOR BRAKE AND ACCELERATOR PEDALS
Filed Aug. 12, 1960
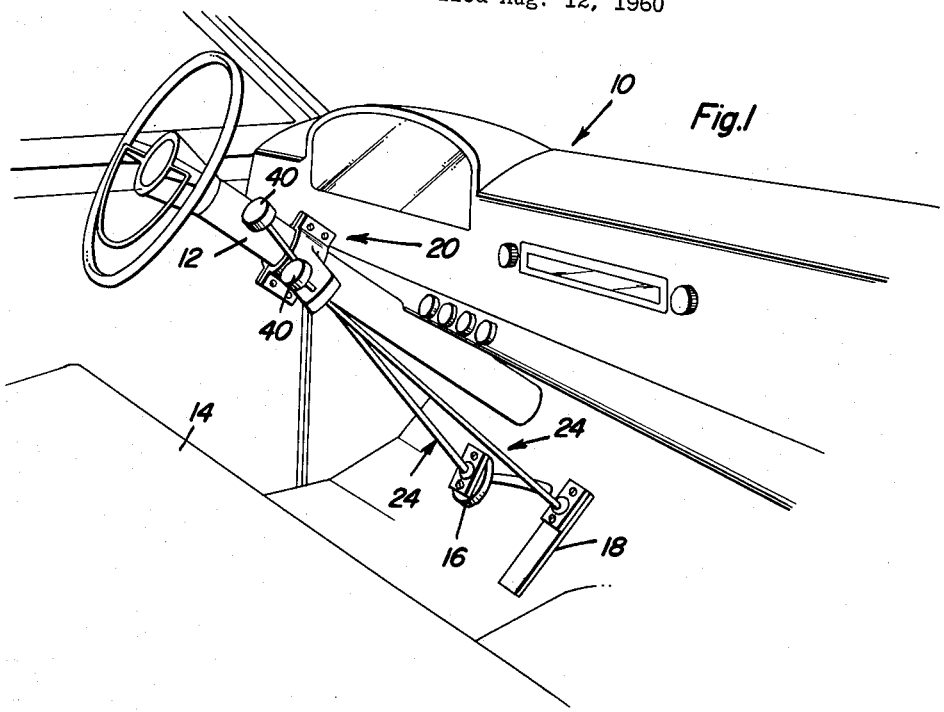
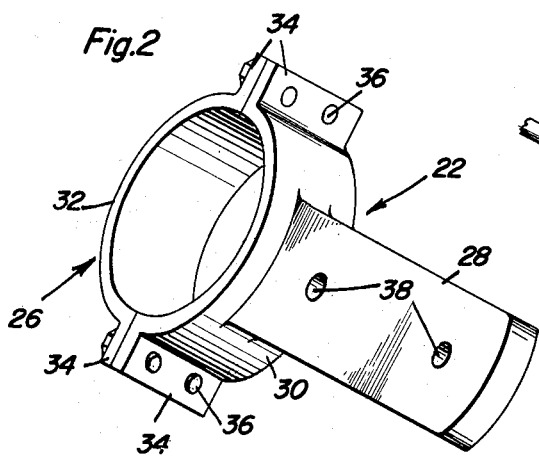
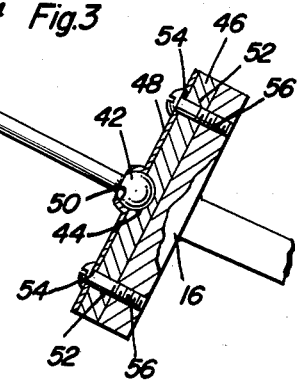
Arthur Whitmore
INVENTOR.

United States Patent Office 3,065,647
Patented Nov. 27, 1962

3,065,647
HAND OPERATING MEANS FOR BRAKE AND ACCELERATOR PEDALS
Arthur Whitmore, 2103 Pear, St. Joseph, Mo.
Filed Aug. 12, 1960, Ser. No. 49,310
2 Claims. (Cl. 74—481)

This invention relates to a hand operated means for actuating brake and accelerator pedals of vehicles.

Although some paraplegics are incapable of driving motor vehicles, paraplegics having only the lower extremities of their bodies paralized would be capable of operating a motor vehicle if a means could be provided whereby the normally foot operated controls of a vehicle could be operated by the hands of a driver.

Although many device have been used in the past to enable persons having paralized lower extremities to operate a motor vehicle, these devices have been quite elaborate in construction and expensive to manufacture. A large percentage of the more modern motor vehicles being produced at the present time have foot operated controls requiring very little pressure to actuate the foot controls and it is therefore the main object of this invention to provide a hand operating means for the foot controls of these newer types of motor vehicles which will be extremely simple in construction and inexpensive to manufacture.

Most of the auxiliary hand controls for the foot controls of a motor vehicle produced heretofore have utilized an elaborate system of levers and other means for multiplying the force delivered by the arm of a vehicle driver inasmuch as older vehicles have had foot controls requiring substantial amounts of operating force and it is a further object of this invention to provide hand operating means for the foot controls of new motor vehicles which require considerably less operating force with the hand operating means being constructed in a manner whereby it may be easily and quickly properly installed in a conventional type of motor vehicle.

Still another object of this invention is to provide a hand operating means in accordance with the preceding objects including at least one handle for each of the foot controls of the vehicle mounted for movement in a direction substantially the same as and aligned with the corresponding foot control.

A final object to be specifically enumerated herein is to provide a device which will conform to conventional froms of manufacture, be of simple construction and easy to operate so as to provide a device that will be economically feasible, long lasting and easy to learn to use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the interior of a motor vehicle and in particular the driver's position of the vehicle showing the manner in which the hand operating means of the instant invention may be readily secured in an operational position and operatively connected to the foot controls of the vehicle;

FIGURE 2 is an enlarged perspective view of the guide assembly of the instant invention; and FIGURE 3 is a side elevational view of the lower end portion of one of the actuating rods of the instant invention showing the manner in which the rod may be operatively connected to a brake pedal, parts of the brake pedal and the means for securing the lower end of the rod to the brake pedal being broken away and shown in section.

Referring now more specifically to the drawings the numeral 10 generally refers to a conventional from of motor vehicle including a steering column 12, a seat 14 and a pair of foot controls 16 and 18 which comprise the brake and accelerator pedals respectively.

The operating means of the instant invention is generally designated by the reference numeral 20 and includes a guide assembly generally referred to by the reference numeral 22 and a plurality of actuating rods generally referred to by the reference numeral 24.

The guide assembly includes a clamp assembly generally designated by the reference numeral 26 adapted for clamping engagement with the steering column 12 of the vehicle 10 and a support arm 28. The clamp assembly 26 includes two generally semi-circular clamp members 30 and 32 whose opposite ends terminate in apertured lug portions 34. The opposite end lug portions 34 of each of the clamp members are outturned and disposed at substantially right angles to the extreme end portions of the clamp members. The clamp members open toward each other and the corresponding lug portions of the clamp members 30 and 32 are juxtaposed. It is to be understood that the clamp members 32 are disposed about the steering column 12 and that fasteners 36 are secured through the lug portions 34 to draw the clamp members 30 and 32 together. In this manner, the clamp assembly 26 clampingly engages the steering column 12.

The support arm 28 is carried by the clamp member 30 and projects outwardly therefrom on the side remote from the clamp member 32. The support arm 28 is provided with a plurality of bores 38 through which a plurality of the actuating rods 24 are slidingly received. The actuating rods 24 are provided with handles 40 on their upper ends and with enlarged spherical terminal portions 42 on their lower ends. The spherical terminal portions 42 are seated within a hemispherical recess 44 formed in a mounting plate 46 and a retaining plate 48 has a centrally apertured hemispherical recess 50 formed therein by which the retaining plate 48 is slidably disposed on the actuating rod 24. The mounting plate 46 and the retaining plate 48 are provided with aligned apertures 52 and 54 respectively through which fasteners 56 are disposed and threadedly engaged in either the brake pedal 16 or the accelerator 18 such as the case may be. Thus, it will be noted that the lower ends of the actuating rods 24 are swivelly connected to the mounting plates 46 which are in turn secured to the brake and accelerator pedals 16 and 18. Inasmuch as both the brake pedal and accelerator pedal of a conventional vehicle are normally provided with spring return means for urging the pedals to an off position, further modification of the brake and accelerator systems is not needed inasmuch as the rods 24 are freely slidable in the bores 38 and the conventional spring return means of the pedals 16 and 18 will be sufficient to urge the actuating rods upwardly to their off positions.

Although the guide assembly 22 has been illustrated as including a clamp assembly 26, it is to be noted that any convenient means may be provided on the guide assembly 22, and in particular the support arm 28 for retaining the latter in an advantageous position above the brake and accelerator pedals 16 and 18 of the vehicle 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Hand operating means for depressing a vehicle foot control, said hand operating means comprising a guide assembly defining an elongated arm having a bore formed transversely therethrough and means adapted to secure said arm to a vehicle steering column above the foot control of the vehicle with the bore substantially axially aligned with the foot control of the vehicle and said arm extending transversely of said steering column, an actuating rod having a portion intermediate its opposite ends snugly and slidably disposed through said bore mounting said rod for longitudinal reciprocal movement, a handle on one end of said rod, a mounting plate including means adapted for securement to the depressible foot control of said vehicle, means swivelly mounting said mounting plate on the other end of said rod, said mounting plate having a hemispherical recess formed therein, said swivel mounting means including a diametrically enlarged spherical terminal portion on the other end of said rod seated in said recess, a retaining flange having a centrally apertured hemispherical recess formed therein by which said retaining flange is slidably disposed on said rod, said recesses opening toward each other and said means adapted for securing said mounting plate to a foot control of said vehicle including means removably securing said retaining plate in overlying relation on said mounting plate whereby said terminal portion is maintained captive within said recesses.

2. The combination of claim 1 wherein said means adapted to secure said arm to a vehicle steering column includes means adapted for removable clamping engagement with a vehicle steering column.

References Cited in the file of this patent
UNITED STATES PATENTS

| | | |
|---|---|---|
| 1,310,690 | Culver | July 22, 1919 |
| 1,681,380 | Taman | Aug. 21, 1928 |
| 1,692,883 | Bennett | Nov. 27, 1928 |
| 1,703,709 | Clinger | Feb. 26, 1929 |
| 1,769,191 | Russell et al. | July 1, 1930 |
| 1,812,352 | McCurdy | June 30, 1931 |
| 1,906,366 | Burns | May 2, 1933 |
| 2,071,883 | Hodny | Feb. 23, 1937 |
| 2,652,221 | Kampa | Sept. 15, 1953 |
| 2,777,335 | Engberg et al. | Jan. 15, 1957 |
| 2,785,835 | Brumfield | Mar. 19, 1957 |
| 2,866,356 | Elam | Dec. 30, 1958 |